United States Patent
Parks (10) Patent No.: US 11,127,338 B2
(45) Date of Patent: Sep. 21, 2021

(54) SYSTEM AND METHOD FOR PRESENTING DATA AT VARIABLE QUALITY

(71) Applicant: DISPLAYLINK (UK) LIMITED, Cambridge (GB)

(72) Inventor: Matthew Parks, Cambridgeshire (GB)

(73) Assignee: DISPLAYLINK (UK) LIMITED, Cambridge (GB)

(*) Notice: Subject to any disclaimer, the term of this patent is extended or adjusted under 35 U.S.C. 154(b) by 0 days.

(21) Appl. No.: 16/762,120

(22) PCT Filed: Oct. 26, 2018

(86) PCT No.: PCT/GB2018/053113
§ 371 (c)(1),
(2) Date: May 6, 2020

(87) PCT Pub. No.: WO2019/092399
PCT Pub. Date: May 16, 2019

(65) Prior Publication Data
US 2020/0265771 A1 Aug. 20, 2020

(30) Foreign Application Priority Data
Nov. 8, 2017 (GB) ...................................... 1718488

(51) Int. Cl.
*G09G 3/20* (2006.01)
*H04N 13/344* (2018.01)
(Continued)

(52) U.S. Cl.
CPC ....... *G09G 3/2092* (2013.01); *G02B 27/0172* (2013.01); *G06F 3/147* (2013.01);
(Continued)

(58) Field of Classification Search
CPC .............. G02B 27/017; G02B 27/0172; G02B 2027/0112; G02B 2027/014; G02B 2027/0141; G02B 2027/0147; G02B 2027/0178; G06F 3/013; G06F 3/0484; G06F 3/1407; G06F 3/1423; G06F 3/147; G06F 2203/011; G06F 3/011;
(Continued)

(56) References Cited

U.S. PATENT DOCUMENTS

9,779,478 B1 10/2017 Wilson et al.
10,564,715 B2 * 2/2020 Spitzer ............... G02B 27/0093
(Continued)

*Primary Examiner* — Nelson M Rosario
(74) *Attorney, Agent, or Firm* — Haynes and Boone, LLP (57) ABSTRACT

A method of presenting visual information on a screen (306) involves defining a boundary (314) delineating a first region of the screen (which may be towards a centre of the screen) from a second region of the screen (which may be towards a periphery of the screen), displaying a first portion of the visual information in the first region of the screen at a first display quality, and displaying a second portion of the visual information in the second region of the screen at a second, lower, display quality. The method further involves blurring the visual information for display in at least a portion of the second region. The location of the boundary (314) may change over time, and may be based on where a user is looking, or is expected to be looking, or on the type of information being displayed or based on other parameters.

20 Claims, 6 Drawing Sheets

(51) Int. Cl.
  *G02B 27/01* (2006.01)
  *G06F 3/14* (2006.01)
  *G06F 3/147* (2006.01)
  *G06T 9/00* (2006.01)
  *G06T 19/00* (2011.01)

(52) U.S. Cl.
  CPC .......... *G06F 3/1407* (2013.01); *G06F 3/1423* (2013.01); *G06T 9/00* (2013.01); *G06T 19/006* (2013.01); *H04N 13/344* (2018.05); *G09G 2300/026* (2013.01); *G09G 2320/04* (2013.01); *G09G 2360/04* (2013.01)

(58) Field of Classification Search
  CPC ......... G06T 19/006; G06T 9/00; G09G 3/002; G09G 3/02; G09G 3/2092; G09G 3/2096; G09G 2300/026; G09G 2320/04; G09G 2340/02; G09G 2340/0407; G09G 2340/06; G09G 2350/00; G09G 2360/04; H04N 13/344; H04N 19/00; H04N 19/103; H04N 19/117; H04N 19/14; H04N 19/154; H04N 19/167; H04N 19/17; H04N 19/176; H04N 19/186; H04N 19/59; H04N 19/63; H04N 19/85
  See application file for complete search history.

(56) References Cited

U.S. PATENT DOCUMENTS

| | | |
|---|---|---|
| 2016/0062121 A1 | 3/2016 | Border et al. |
| 2017/0287447 A1 | 10/2017 | Barry et al. |
| 2017/0295373 A1 | 10/2017 | Zhang |

\* cited by examiner

SYSTEM AND METHOD FOR PRESENTING DATA AT VARIABLE QUALITY

CROSS-REFERENCE TO RELATED APPLICATIONS

This application is a U.S. national stage application under 35 U.S.C. § 371 of International Patent Application No. PCT/GB2018/053113, filed on Oct. 26, 2018, which claims the benefit of Great Britain Patent Application No. 1718488.8 filed on Nov. 8, 2017, the contents of each of which are incorporated herein by reference in their entirety.

This invention relates to methods for presenting visual information at different quality levels, in particular in the context of Virtual Reality (VR) and Augmented Reality (AR) systems.

There is a drive to improve the display quality of visual systems to improve user experience. This can present particular challenges in VR/AR systems due to the proximity of the user's eyes to the screens. While advances in screen technology are helping to improve the user experience by removing obvious gaps between pixels, or blockiness due to individual pixels being discernible, a secondary issue has arisen in which the rate at which data is able to be delivered to the screens is insufficient to provide information in full colour at the maximum display resolution of the screen at the desired framerates (90 fps, or even 120 fps).

Bottlenecks may occur at various points in the processing and transporting stages of the pipeline from graphics source to display on the screen which may add to this problem. For example, the output data rate of graphical processing hardware may be insufficient to provide the desired video quality for display. The bandwidth of communications links (particularly wireless ones which may be more likely to fluctuate than wired ones) forming the pipeline may be insufficient to transport data at the required rate. The speed and efficiency with which encoding and decoding of information is performed may also hold up the system. As an example, an uncompressed 1080p video with a colour depth of 24 bits, being transmitted at a framerate of 60 fps requires nearly 3 Gbit/s. While compression can help alleviate this burden, it is clear that the demands on the system are large if full resolution, colour depth and/or framerate is desired. Moreover, when a lossy compression system is used at high compression rate, while the amount of data to be transferred can be significantly reduced, visual artefacts can be generated by the compression algorithm. There is therefore a clear trade-off between reducing the burden on the image processing and data transport parts of such systems and the goal that a user of the system experiences high quality display of visual information.

In cases where the data is not supplied fast enough to meet the stringent criteria, the system may prioritise certain data types to maximise the user's enjoyment. Indeed, even where the system is able to keep up with demand in terms of data rate, it may anyway be beneficial to focus limited resources on certain data types in order to ensure that the perceived quality of data as viewed by a user is optimised.

The present invention aims to address the issue of deciding how best to present visual information to a user.

Disclosed herein is a method of presenting visual information on a screen, comprising: defining a boundary delineating a first region of the screen from a second region of the screen; displaying a first portion of the visual information in the first region of the screen at a first display quality; displaying a second portion of the visual information in the second region of the screen at a second display quality; wherein the second display quality is lower than the first display quality; and the method includes blurring the visual information for display in at least a portion of the second region. In parts of the image being displayed at lower quality, the occurrence of artificially sharp boundaries can occur. While reduced quality per se can be provided in a manner which is unlikely to be noticed by a viewer (e.g. by careful selection of where the lower quality regions are), visual artefacts caused by the low display quality can nevertheless be very noticeable. Consequently, blurring of regions likely to generate such artefacts (i.e. the lower quality regions) can help to reduce the noticeability of such artefacts and improve the user's viewing experience. Since low quality regions can be chosen to coincide with regions of low visual acuity in the human visual system, they are particularly suited to blurring steps, which pass largely unnoticed by low acuity parts the human visual system. This is a good trade-off for removing blocky edges, which by contrast are particularly noticeable in low visual acuity regions of view.

The blurring may include parts of the first and/or second regions of the screen which are adjacent to the boundary. By reducing the quality, the load on the visual processing and delivery chain can be reduced. It is known, for example, that human vision is more perceptive in certain areas than others, depending primarily on models of visual perception in healthy eyes, but also incorporating e.g. models to address various visual impairments. In areas anticipated to be less receptive to high quality visual information, the visual information presented can be of a lower quality. Based on visual models; available bandwidth, processing power, etc.; and other information (e.g. user settings and calibrations), the method involves selecting a region for presentation at lower quality to reduce the data burden while minimising negative effects on the user's experience. In cases where the visual information for display is video information, the changing nature of the information with time can help to further reduce the noticeability of artefacts.

The relative size of the first and second regions of the screen can be adjusted to account for the available resources for delivering data. That is, when lower bandwidth/data rates are available, the high quality area can be shrunk to ensure that every part of the screen is displaying information, albeit parts may be displaying at reduced quality. When more resources are available, the high quality region can be expanded. In general, the method may include ensuring that the first region is as large as possible, given the constraints of the information delivery system. In some examples, the information may arrive in a compressed or encoded format, but be decompressed or decoded at different quality The amount of the image to be decompressed or decoded at each quality can be adjusted to adapt to information processing power available at the decompression and display parts of the system.

However, while the human visual system may not notice lower quality in some regions, visual artefacts may be produced which are noticeable. In particular, sudden transitions between higher and lower quality regions may be noticeable, even in cases where the transition happens in a region of lower visual acuity, since the human visual system is better at detecting changes than it is at detecting detail in such regions. Indeed, in some cases, regions of the same quality can form edge artefacts where compression algorithms result in a loss of data. For example, the JPEG and MPEG encoding schemes make use of discrete cosine transforms over a sub-region of a frame, known as a macroblock (which may be, for example 16×16 pixels and is sometimes referred to as a tile). No attempt is made to ensure that the edge of one macroblock merges smoothly with adjacent macroblocks and consequently the interface between two such macroblocks can form a sharp edge, which is easily detected, even when it occurs in a region of low visual acuity. As a crude example, an extreme (and relatively easily implemented) compression system would be to replace a block of pixels with the average colour value of those pixels. Even for relatively small pixel blocks (say 8×8), this can result in noticeable edges between blocks which have been averaged in this way. Consider, for example, a smooth fade between two colours. An averaging system such as that described above would convert the smooth fade into strips 8 pixels wide, sharply delineated from one another. In any event, boundaries of these types can manifest themselves as artificial edges or lines in regions of the visual field which have been determined to correspond to lower visual acuity. When these sharp transitions catch a user's eye, the user may try to focus on these edges, causing them to disappear (or at the least be clearly resolvable as the artefact that they are), but constant adjusting of focus can be distracting for a user. This is particularly acute in immersive environments such as VR/AR, in which the user is often encouraged to focus on particular screen areas. Put another way, the blurring step helps to present the visual information with reduced noticeability of artefacts caused by the reduction in display quality. These artefacts may occur in the second region, e.g. as block edge artefacts, or at the boundary between the first and second regions, where an abrupt change in display quality could register as an edge artefact.

To solve this problem, a blurring step is introduced to remove sharp boundaries in the image, for example between adjacent low quality tiles, or to mask abrupt changes in display quality that would otherwise register as sharp edges in the field of view of a user. The human visual system is very much better at detecting sharp edges and blockiness than it is at noticing a blurring in regions of low visual acuity. In order that the boundaries themselves are not visible, the blurring is performed close to the boundary between different display qualities, or close to the boundary between adjacent low quality blocks. In this context "close to the boundary" (sometimes also referred to as adjacent to the boundary) may comprise within a set number of pixels, a region proportional to the distance from e.g. the centre of the screen, etc. In some cases, the blurring may be performed with a filter. The strength of the blurring step may be related to the distance from the boundary. For example, the blurring may be strongest at the boundary and decrease in strength further from the boundary. Moreover, the strength of the blurring may be based on a probabilistic effect, wherein the strength is effectively random in a region adjacent to the boundary. These two effects may be combined to provide a probabilistic approach to the blurring which is less likely to result in strong blurring further from the boundary than close to the boundary.

Block boundaries can be especially problematic in VR/AR systems, they are static in the field of view and in the foreground on the lens. The user's attention is therefore drawn to these artefacts, rather than the intended parts of the displayed image—they are a distraction to a user's enjoyment of the experience.

In some examples, the blurring step may be applied to the entirety of the second region, e.g. to ensure that blockiness is removed anywhere it is likely to occur. In other examples, the blurring may be applied to visual information for display adjacent to portions of the second region where neighbouring tiles meet. For example, the blurring may be used to blur the boundary between low quality tiles, which is a major source of the blocky appearance in the second region. In other examples the blurring may occur adjacent to the boundary between the first and second regions. It will be clear that, depending on the context, different combinations of these blurred regions can be implemented.

In cases where the boundary between high and low quality display is blurred, the blurring should be applied to regions adjacent to the boundary at least enough to ensure that there is no noticeable boundary. This provides balance between retaining high quality visual data for display to a user and ensuring that artefacts are masked. For example, a ring a particular number of pixels wide at the periphery of the first region could be the region chosen to be blurred. In other examples, where the display region is divided into tiles (see below for detail), the outermost ring of tiles of the first region could be subjected to the blurring step.

In some cases, there may be more than two regions, each having a different display quality. In these cases, the amount of blurring (indeed whether to blur at all) could be determined based on the display quality. For example, it may be known that artefacts are typically not visible above particular display qualities. Blurring could then be applied to any areas having a lower display quality than a particular threshold. As set out above, the blurring may also extend into the lowest quality region which is above the threshold, in order to blur the boundary between the two different quality regions. In yet a further example, the display quality of a region may determine the strength of blurring and/or the probability of blurring occurring in a given portion of that region. For example, the compression strength may be correlated with the strength of blurring and/or the probability that a particular region is blurred. This would cause the most/strongest blurring in the regions of lowest display quality (which would most benefit from blurring).

Because an aim of the method is to reduce per-tile artefacts it would be beneficial if, in the case where the reduced quality is due to higher compression, the blurring filter region is not based on the same subdivisions of the display area as the codec uses, in order that the blurring can smooth the transition effectively.

The blurring step may include dithering, Gaussian blur, or other deblocking filters. For example, the H.264 MPEG encoding standard includes an in-loop deblocking filter. These methods are well known for smoothing out sharp transitions in visual information. In general, while the various steps could be performed at any point in the processing chain, the method can be applied as a post-processing step where a filtering step (for blurring) is applied after decompression, but before display of the visual information.

As used throughout this document, including in the discussion above, the term "display quality" can refer to various parameters. Predominantly, this refers to the level of compression which has been applied to the visual data. Higher compression rates cause greater loss of visual information when decompressed. This can result in blockiness and sharp edges between adjacent regions of the image, where the colour or texture changes abruptly. As noted above, these edges, known as block edge artefacts, can be easily detected by a user, even if they occur in a region of the display associated with a relatively low visual acuity. A related variation of quality is display resolution, for example the number of distinct, independent colour regions presented in the display. Note that this is separate from the number of pixels available in the display, for the reasons given above. In some cases, e.g. the screen may be instructed to display square blocks of four pixels (2×2) as the same colour, brightness, tone etc., to reduce the display resolution. The extent to which the visual information has been compressed can be a proxy for altering the display resolution, or indeed in some cases, a reduction in display resolution may be implemented as a substitute for a more complex encoding step. In other cases, colour depth, or the frame rate may be reduced for selected parts of the display as part of the change in display quality.

In many codecs (which can result in block edge artefacts), the block size over which compression algorithms run is usually fixed. The output quality can in theory be altered using different encoding parameters, but the main theme is that higher compression discards more data, and increases the occurrence of visible artefacts.

Note that the purpose is primarily to prevent sharp edges from being noticeable to a viewer. Therefore, it is not necessary that blurring be performed in both the first and second regions of the screen (i.e. on both sides of the boundary). In some cases, it may be beneficial, for example to blur only on the lower quality side, where it may be noticed less by a user. In other cases, blurring algorithms may be more effective at blurring higher quality data, since there is more information to work with. Of course, in some cases, the blurring may include regions from both the high and low quality region, thereby forming a widened region around the boundary in which blurring is applied and gaining benefits from each effect mentioned above, without requiring too much blurring in the higher quality region. Similarly, in some cases, there is no need to blur on both sides of a boundary between two tiles in the second region, instead blurring only one of these tiles. This may allow the blurring algorthim to operate more efficiently.

Optionally, the first region of the screen is towards the centre of the expected field of view of a user and the second region is towards the periphery of the expected field of view of a user. Many models of the human visual system take account of the fact that the human eye is less sensitive at peripheral vision than it is at the centre of the field of view, so selecting the periphery of the image as an area for reduced display quality is a logical first approximation for the region in which such reduced quality is least likely to be noticed. Of course, certain degenerative eye conditions, e.g. cataracts, can add another layer to the model, in which other regions (such as the central part of the screen) are more suitable for low quality information to be displayed. A user could, for example, self-calibrate the screen (e.g. the system could display different regions at different qualities, and ask a user to select their preferred arrangement), or make use of an automated calibration procedure, which could inform the system as to the regions in which a user does not notice image quality reduction. The expected field of vision may be determined by eye tracking methods, to work out where a user is looking in real time. Alternatively, it may be assumed, by way of ergonomic considerations, and/or by incorporating information relating to the specific visual information being displayed. For example, it may be known that the information being displayed shows a particular object which a user is likely to focus their attention towards. This part of the screen could be determined to be part of the first region of the screen (high display quality), while other areas form part of the second region of the screen.

In some examples, the first region of the screen is towards the centre of the screen and the second region is towards the periphery of the screen. Rather than track the user's field of vision (e.g. directly or implicitly, as above), the system could assume that it is most comfortable for a user to look directly ahead. Typically viewing arrangements are such that a normal viewer looking straight ahead will look generally towards the centre of the screen, so defining central regions of the screen as the higher quality regions is a good first step at ensuring that the user's focus is directed towards the highest quality regions.

The location of the boundary may be based on a radial distance from the centre of the screen. A simple radial model is a convenient way to capture a complex visual system, by providing a high quality region within a circular boundary and a lower quality region outside it. Small variations in this model, e.g. introducing a small elliptical character to the circle, can be used to better map the regions to a particular model of human vision. In other cases, since a screen often is made from pixels, the boundary cannot be an exact circle, but must at the least be located between pixels.

A slight variation of this is where the location of the boundary is based on a foveal vision region in the expected field of view of a user. This may be effectively the same as a fixed radial distance, where the visual model is one with a circular foveal region. In other cases, the shape may be somewhat different from a circular shape, e.g. an elliptical model.

In the above examples, the decision as to the exact location of the boundary where the nominal radius of foveal region boundary crosses a pixel can be based on a probabilistic model, or to take a path which results in the smallest deviation from the boundary provided by the constant radius or foveal model. In any case, the radial distance or foveal region chosen will determine the relative areas of the first and second regions of the screen.

The location of the boundary may also be based in part on the expected position of a user's eye(s) relative to the screen. For example, when a user's eyes are closer to the screen, there will be a smaller region of the screen which is "central" and a larger region which is "peripheral" due to the perspective afforded by the closeness of the user's eyes to the screen. Similarly, a user viewing the screen from a non-central location or at an angle will cause different parts of the screen to be central and peripheral, relative to the actual centre/periphery of the screen. The user's eyes can be assumed to be in a non-central position, which can be used to determine the boundary location. Alternatively, eye-tracking software can be used to determine the location of a user's eyes and/or the direction in which they are pointing.

The location of the boundary may be static, or it may change over time. For example, a static boundary could be used where insufficient resources are available at all times to deliver data to the screen at the desired rate (e.g. a user has set a display quality at a higher level than the system can accommodate). Alternatively a changeable boundary may be provided to dynamically adapt to changing conditions.

The location of the boundary may be based in part on one or more of: the type of visual information being displayed; predicted position and/or movement of a user's eye(s); detected position and/or movement of a user's eye(s); focal parameters of a lens system; available bandwidth for transmitting the information to the screen; available processing power for decoding the visual information for display; and/or user settings. For example, the boundary may be provided at one of two locations, such that the one that results in a larger region being displayed at high quality is displayed when sufficient resources are available, and the other boundary location is used where resources are more limited. As a tool to help visualisation, this could be thought of (in the context of a circular boundary) as a first region in which higher quality visual information is displayed, surrounded by an annular region, the annular region being surrounded by a second region in which lower quality visual information is displayed. The quality at which the annular region is displayed is dependent on available resources, but will either match the display quality of the first region or the display quality of the second region. The boundary in this case will occur in either case at the point where the quality changes from higher to lower.

Regarding user settings, as set out above, there are various settings, e.g. relating to display preferences which may be set by a user which can affect the display. These may include, for example special modes to assist with visual impairment (glaucoma, cataracts, colour blindness, etc.). Such modes being set can help the display software to determine regions in which a user is less likely to notice detail.

Motion of a user's eye (predicted or measured) can help the system adjust where a user looks in a different direction. This may be caused by a head movement or (particularly in the case or VR/AR) movement of the eyes relative to the head.

On that note, the lens systems in VR/AR headsets are sometimes particularly strong and may be adjusted to aid a user in a comfortable viewing experience. The position of the lenses in relation to the headset can be measured by the headset and used to determine the parts of the screen which a user is most likely to notice detail in.

Where the boundary moves, the blurring may be caused in part by changes in the location of the boundary over time. For example, if the visual information is video information (even if it is video information of a static image), the video information may be presented at a very high framerate (90 or even 120 fps). If each consecutive frame has a different boundary location (or at least has the possibility of a different location where the boundary location is in part a probabilistically determined parameter), then there will not be a hard boundary when the information is averaged over several frames, which it would be by the human visual system when the display framerate is high enough (e.g. 90 or 120 fps). Consequently, a user would perceive blurring of the boundary by virtue of the changing location of the boundary, rather than explicitly blurring the visual information near the boundary.

The screen may be divided into a series of tiles (also known as macroblocks), wherein the display quality is uniform over each tile. Partitioning the screen and/or the data in this way can simplify the processing steps. It is convenient to treat each tile in the same way (i.e. display visual information at the same quality over the whole tile) since each tile can then be processed as a unit rather than having to consider each pixel separately. A tile can in theory be any size from individual pixels (in which case no distinction is made between pixels and tiles) to the entire area of the screen (in which case, once more the concept of a tile as a separate entity becomes redundant). The choice of how large a tile is depends on the balance between processing resources available and fineness of control required. Typical tiles sizes are 4×4, 8×8 or 16×16 pixels, for example, but this will depend in general on the codec being used. Since tiles are usually rectilinear, any definition of the boundary which is based on a curved line (constant radius from the screen centre, circular or elliptical foveal regions, etc.) may need to be deformed from the desired curved shape, in order that the boundary runs between regions of high quality and low quality from one another along tiles edges. This is a consequence of the feature in which display quality is uniform over each tile. How to deform the boundary to achieve this may be achieved analogously to the individual pixels cases described above.

In some cases, the determination of the location of the boundary is performed in a probabilistic manner; and wherein the probability that a tile is in the first region of the screen is related to the location of that tile with respect to the centre of the screen or the centre of a foveal vision region in the expected field of view of a user. This method incorporates the visual models proposed above, and relates the probability of the tile being high quality directly to the likelihood that the tile is within a region of high visual acuity (in the model being used). Consequently, the tiles in which low quality visual information would most likely be noticed correspond to the tiles in which low quality visual information is least likely to be displayed.

As a specific example of this method in action, some cases may comprise the following three conditions:
1. where a given tile is located such that the entire tile is inside the foveal vision region in the expected field of view of a user or located less than a radial distance from the centre of the screen the probability is 1;
2. where a given tile is located such that the entire tile is outside the foveal vision region in the expected field of view of a user or located more than the radial distance from the centre of the screen the probability is 0;
3. where a given tile is located such that only a part of the tile is inside the foveal vision region in the expected field of view of a user or located less than the radial distance from the centre of the screen the probability is between 0 and 1

In combination, this set of instructions results in first region which is always displayed at high quality (ensured by step 1). There is also a second region which is always displayed at low quality (ensured by step 2). Lastly, there is a region in which the display quality may be high or low, depending on a probabilistic determination (step 3). Note that the display quality will be high or low (i.e. conform to one of a predetermined set of: particular resolution, colour depth and/or framerate, etc. parameters, where the different parameter sets correspond roughly to higher or lower amounts of processing and transport resource requirements), but not an intermediate value. That is, each tile will be displayed at a high quality or a low one with a given probability. The display quality may be determined from the probability on a regular basis, e.g. each time a new frame is due to be displayed, or a predetermined number of times a second. In this way, over a long time period, the proportion of frames which a given tile displays at high quality is illustrative of the probability of that tile being a high quality tile.

A convenient manner of calculating the probability is to base it on the area of the tile. For example, in some cases, the probability is proportional to the proportion of the tile that is inside the foveal vision region in the expected field of view of a user or located less than the radial distance from the centre of the screen. This effectively retains the exact boundary of the radial distance method or a curved foveal region model by relating the exact (usually curved) boundary to the probability of that tile being displayed at high quality. Put another way, if a boundary is intended to be drawn at a constant radius which happens to intersect a tile such that exactly half the tile is inside the boundary and half is outside, then the probability of the tile displaying visual information at the higher quality could be determined to be one half. Other ratios would lead naturally to other probabilities. A simple relationship would be a linear one, e.g.

P(HQ)=A(inside)/A(total), where P(HQ) is the probability that the tile is displayed at the higher quality, A(inside) is the area of the tile which is inside the nominal demarcation, and A(total) is the total tile area. A complimentary equation is naturally formed: P(LQ)=A(outside)/A(total), where P(LQ) is the probability that the tile is displayed at the lower quality and A(outside) is the area of the tile which is outside the nominal demarcation. Of course, other, non-linear relationships between area ratios and probabilities are also possible, depending on the desired outcome.

The relative areas can be determined by simple geometric calculations once the regions of the screen which would ideally be high or low quality have been determined. By overlaying on the screen such an idealised line, the tiles which are intersected by the line can be analysed and the ratio of the tile on either side of the line calculated and a probability determined. As set out above, geometric calculations could be performed. An even simpler method could use pixel counting—i.e. counting the number of pixels inside or outside the line. This naturally leaves the problem of what to do about intersected pixels. In some cases, they can be discounted (which may result in the probabilities not exactly matching the area ratios). In other cases, they may be determined to be one side of the line or the other based on whether most of the pixel (i.e. more area) is one side or other of the line. Whichever method is used to delineate the first and second regions from one another, it is clear that the effect will be to change the regions to which the blurring filter is applied, by changing the regions which form the second region (where blurring is applied to e.g. reduce block edge artefacts) and also in some cases by shifting the location of the boundary between the first and second regions, where blurring may also be applied to reduce edge artefacts arising from the abrupt change in display quality.

In some cases, the screen is mounted in a headset configured to be worn on a viewer's head. This allows the method to be applied to VR/AR systems, in which the need for reducing the visibility of artefacts is greater, due to the closeness of the viewer's eyes to the screen.

In such cases there may be two screens in the headset, each one operating as set out in any preceding claim. The screens may form part of a single screen, divided into two parts (one for each eye), or they may be physically separate entities.

Where two screens are present, the method set out above may be carried out independently in respect of visual information to be presented on each of the two screens. This allows the system to tailor the visual information to the two eyes differently, and thereby to optimise the delivery of content with regard to processing and delivery requirements. The size and shape of the first region may be different on each screen, for example.

Also disclosed herein is a system for presenting visual information, comprising: a processor; a source of visual information; and a screen; wherein the processor is configured to: define a boundary delineating a first region of the screen from a second region of the screen; and receive visual information from the source and send visual information to the screen in a format which causes the screen to: display a first portion of the visual information in the first region of the screen at a first display quality; display a second portion of the visual information in the second region of the screen at a second display quality; wherein the second display quality is lower than the first display quality; and the processor further blurs the visual information for display in at least a portion of the second region. In parts of the image being displayed at lower quality, the occurrence of artificially sharp boundaries can occur. While reduced quality per se can be provided in a manner which is unlikely to be noticed by a viewer (e.g. by careful selection of where the lower quality regions are), visual artefacts caused by the low display quality can nevertheless be very noticeable. Consequently, blurring of regions likely to generate such artefacts (i.e. the lower quality regions) can help to reduce the noticeability of such artefacts and improve the user's viewing experience. Since low quality regions can be chosen to coincide with regions of low visual acuity in the human visual system, they are particularly suited to blurring steps, which pass largely unnoticed by low acuity parts the human visual system. This is a good trade-off for removing blocky edges, which by contrast are particularly noticeable in low visual acuity regions of view.

The blurring may include parts of the first and/or second regions of the screen which are adjacent to the boundary prior to sending the visual information to the screen. The system may also include encoders and decoders to compress and decompress the visual information. In some cases, the processor may be associated with the screen, and the determination of high or low quality display may be performed once the data has arrived at the screen data processing part of the system. This may include, for example, deciding to decode particular parts of the received data at high quality, or applying the blurring step once the data has arrived. In other cases, the decision may have been made before the data arrives at the data processing parts of the screen, e.g. so that lower bandwidth need be used to send the data to the screen in the first place. The data source may comprise a disc e.g. CD, DVD, Blu-Ray etc. and suitable reading apparatus. In other cases, it may include streaming information from a remote source, e.g. the internet, or receiving visual information via an antenna or satellite dish.

By reducing the quality, the load on the visual processing and delivery chain can be reduced. It is known, for example, that human vision is more perceptive in certain areas than others, depending primarily on models of visual perception, but also incorporating e.g. visual impairment models. In areas anticipated to be less receptive to high quality visual information, the visual information presented can be of a lower quality. Based on visual models; available bandwidth, processing power, etc.; and other information (e.g. user settings and calibrations), the method involves selecting a region for presentation at lower quality to reduce the data burden while minimising negative effects on the user's experience. In cases where the visual information for display is video information, the changing nature of the information with time can help to further reduce the noticeability of artefacts.

The relative size of the first and second regions of the screen can be adjusted to account for the available resources for delivering data. That is, when lower bandwidth/data rates are available, the high quality area can be shrunk to ensure that every part of the screen is displaying information, albeit parts may be displaying at reduced quality. When more resources are available, the high quality region can be expanded. In general, the method may include ensuring that the first region is as large as possible, given the constraints of the information delivery system. In some examples, the information may arrive in a compressed or encoded format, but be decompressed or decoded at different quality. The amount of the image to be decompressed or decoded at each quality can be adjusted to adapt to local information processing power available.

However, while the human visual system may not notice lower quality in some regions, visual artefacts may be produced which are noticeable. In particular, sudden transitions between higher and lower quality regions may be noticeable, even in cases where the transition happens in a region of lower visual acuity, since the human visual system is better at detecting changes than it is at detecting detail in such regions. Indeed, in some cases, regions of the same quality can form edge artefacts where compression algorithms result in a loss of data. For example, the JPEG and MPEG encoding schemes make use of discrete cosine transforms over a sub-region of a frame, known as a macroblock (which may be, for example 16×16 pixels and is sometimes referred to as a tile). No attempt is made to ensure that the edge of one macroblock merges smoothly with adjacent macroblocks and consequently the interface between two such macroblocks can form a sharp edge, which is easily detected, even when it occurs in a region of low visual acuity. As a crude example, an extreme (and relatively easily implemented) compression system would be to replace a block of pixels with the average colour value of those pixels. Even for relatively small pixel blocks (say 8×8), this can result in noticeable edges between blocks which have been averaged in this way. Consider, for example, a smooth fade between two colours. An averaging system such as that described above would convert the smooth fade into strips 8 pixels wide, sharply delineated from one another. In any event, boundaries of these types can manifest themselves as artificial edges in regions of the visual field which have been determined to correspond to lower visual acuity. A user may try to focus on these edges, causing them to disappear (or at the least be clearly resolvable as the artefact that they are), but constant adjusting of focus can be distracting for a user. This is particularly acute in immersive environments such as VR/AR, in which the user is often encouraged to focus on particular screen areas. Put another way, the blurring step helps to present the visual information with reduced noticeability of artefacts caused by the reduction in display quality. These artefacts may occur in the second region, e.g. as block edge artefacts, or at the boundary between the first and second regions, where an abrupt change in display quality could register as an edge artefact.

To solve this problem, a blurring step is introduced to remove sharp boundaries in the image, for example between adjacent low quality tiles, or to mask abrupt changes in display quality that would otherwise register as sharp edges in the field of view of a user. The human visual system is very much better at detecting sharp edges and blockiness than it is at noticing a blurring in regions of low visual acuity. In order that the boundaries themselves are not visible, the blurring is performed close to the boundaries, or close to the boundary between adjacent low quality blocks. "Close" in this context may comprise within a set number of pixels, a region proportional to the distance from e.g. the centre of the screen, etc. In some cases, the blurring may be performed with a filter. The strength of the blurring step may be related to the distance from the boundary. For example, the blurring may be strongest at the boundary and decrease in strength further from the boundary. Moreover, the strength of the blurring may be based on a probabilistic effect, wherein the strength is effectively random in a region adjacent to the boundary. These two effects may be combined to provide a probabilistic approach to the blurring which is less likely to result in strong blurring further from the boundary than close to the boundary.

Block boundaries can be especially problematic in VR/AR systems, they are static in the field of view and in the foreground on the lens. The user's attention is therefore drawn to these artefacts, rather than the intended focal point—they are a distraction to a user's enjoyment of the experience.

In some examples, the blurring step may be applied to the entirety of the second region, e.g. to ensure that blockiness is removed anywhere it is likely to occur. In other examples, the blurring may be applied too visual information for display adjacent to portions of the second region where neighbouring tiles meet. For example, the blurring may be used to blur the boundary between low quality tiles, which is a major source of the blocky appearance in the second region.

In cases where the boundary between high and low quality display is blurred, the blurring should be applied to regions adjacent to the boundary just enough to ensure that there is no noticeable boundary. This provides balance between retaining high quality visual data for display to a user and ensuring that artefacts are masked. For example, a ring a particular number of pixels wide at the periphery of the first region could be the region chosen to be blurred. In other examples, where the display region is divided into tiles, the outermost ring of tiles of the first region could be subjected to the blurring step.

In some cases, there may be more than two regions, each having a different display quality. In these cases, the amount of blurring (indeed whether to blur at all) could be determined based on the display quality. For example, it may be known that artefacts are typically not visible above particular display qualities. Blurring could then be applied to any areas having a lower display quality than a particular threshold. As set out above, the blurring may also extend into the lowest quality region which is above the threshold, in order to blur the boundary between the two different quality regions. In yet a further example, the display quality of a region may determine the strength of blurring and/or the probability of blurring occurring in a given portion of that region. For example, the compression strength may be correlated with the strength of blurring and/or the probability that a particular region is blurred. This would cause the most/strongest blurring in the regions of lowest display quality (which would most benefit from blurring).

Because an aim is to reduce per-tile artefacts it would be beneficial if, in the case where the reduced quality is due to higher compression, the blurring region is not based on the same subdivisions of the display area as the codec uses.

The blurring may include dithering, Gaussian blur, or other deblocking filters. For example, the H.264 MPEG encoding standard includes an in-loop deblocking filter. These are well known for smoothing out sharp transitions in visual information. In general, while the various steps could be performed at any point in the processing chain, the method can be applied as a post-processing step where a filtering step (for blurring) is applied after decompression, but before display of the visual information.

As used in the throughout this document, including in the discussion above, the term "display quality" can refer to various features. Predominantly, this refers to the level of compression which has been applied to the visual data. Higher compression rates cause greater loss of visual information when decompressed. This can result in blockiness and sharp edges between adjacent regions of the image, where the colour or texture changes abruptly. As noted above, these edges, known as block edge artefacts, can be easily detected by a user, even if they occur in a region of the display associated with a relatively low visual acuity. A related variation of quality is display resolution, for example the number of distinct, independent colour regions presented in the display. Note that this is separate from the number of pixels available in the display, for the reasons given above. In some cases, e.g. the screen may be instructed to display square blocks of four pixels (2×2) as the same colour, brightness, tone etc., to reduce the display resolution. The extent to which the visual information has been compressed can be a proxy for altering the display resolution, or indeed in some cases, a reduction in display resolution may be implemented as a substitute for a more complex encoding step. In other cases, colour depth, or the frame rate may be reduced for selected parts of the display.

In many codecs (which can result in block edge artefacts), the block size over which compression algorithms run is usually fixed. The output quality can in theory be altered using different encoding parameters, but the main theme is that higher compression discards more data, and increases the occurrence of visible artefacts.

Note that the purpose is primarily to prevent sharp edges from being noticeable to a viewer. Therefore, it is not necessary that blurring be performed in both the first and second regions of the screen (i.e. on both sides of the boundary). In some cases, it may be beneficial, for example to blur only on the lower quality side, where it may be noticed less by a user. In other cases, blurring algorithms may be more effective at blurring higher quality data, since there is more information to work with. Of course, in some cases, the blurring may include regions from both the high and low quality region, thereby forming a widened region around the boundary in which blurring is applied and gaining benefits from each effect mentioned above, without requiring too much blurring in the higher quality region. Similarly, in some cases, there is no need to blur on both sides of a boundary between two tiles in the second region, instead blurring only one of these tiles. This may allow the blurring algorthim to operate more efficiently.

In some cases, the screen is mounted in a headset configured to be worn on a viewer's head, for example a VR/AR headset. These are systems in which the need to for reducing the visibility of artefacts is greater, due to the closeness of the viewer's eyes to the screen.

The processor may be further configured to carry out any or all of the method steps set out above.

The system may include two screens in the headset, i.e. one for each eye. The screens may form part of a single screen, divided into two parts (one for each eye), or they may be physically separate entities.

Where two screens are present, the processor may be configured to carry out any or all of the processing steps set out above independently in respect of visual information to be presented on each of the two screens. This allows the system to tailor the visual information to the two eyes differently, and thereby to optimise the delivery of content with regard to processing and delivery requirements.

Specific examples will now be described in detail, with reference to the Figures, in which.

Figure 1:
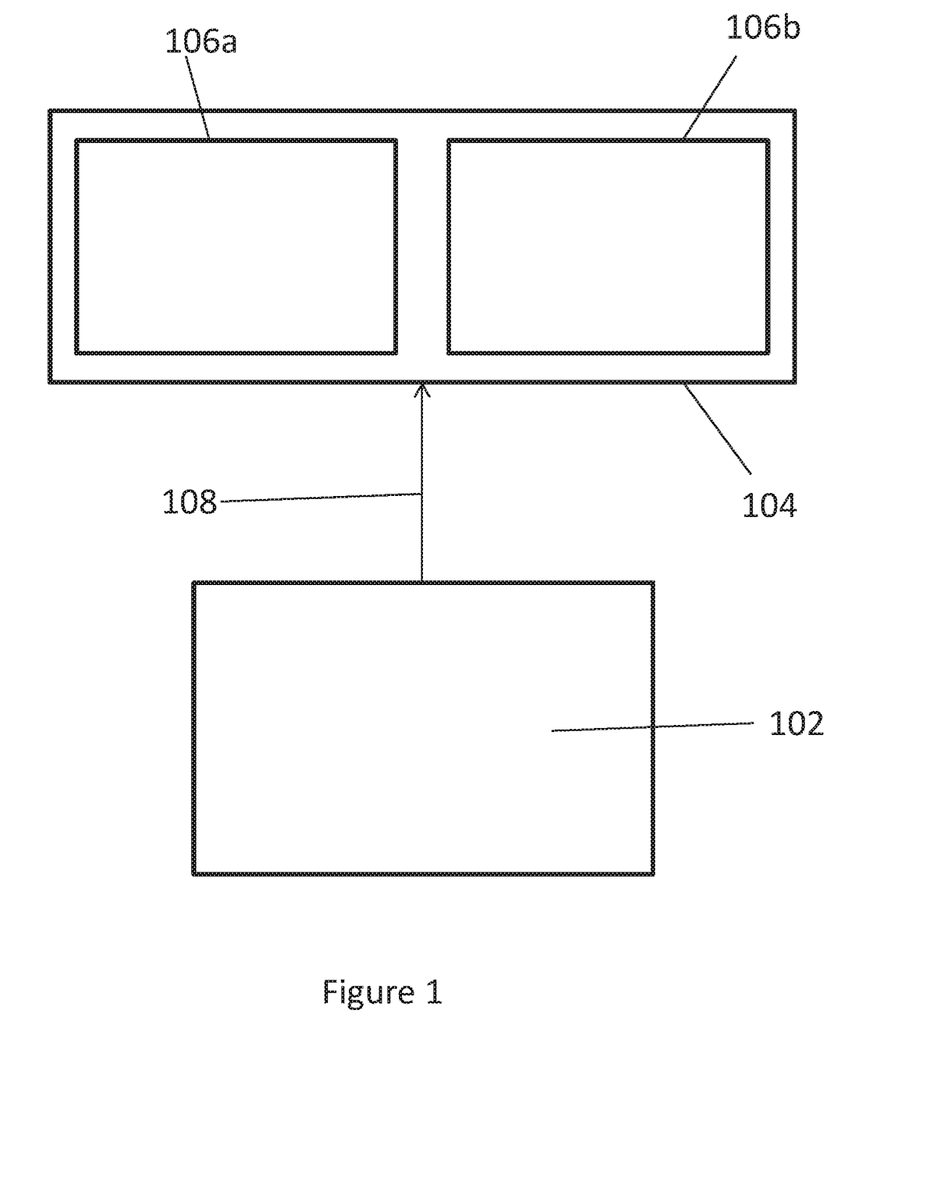
FIG. 1 shows a schematic of a VR or AR headset.

Turning now to FIG. 1, which shows a visual display unit in the form of a virtual reality (VR) or augmented reality (AR) headset 104 connected to a host device 102, which may be a computing device, gaming station, etc. and is an example of a base station from which signals and data are sent. The headset 104 incorporates two screens 106a, 106b, which may be embodied as a single panel split by optical elements. In use, one display is presented to each of a viewer's eyes. The host device 102 generates image data for display on the screens 106a, 106b and transmits the image data to the virtual or augmented reality headset 104.

Augmented reality glasses also have two screens, each associated with one of the user's eyes, similar to the virtual reality headset 104 shown in FIG. 1A. This example differs in that the display panels are translucent so as to allow a user to view their environment through the panels 106a, 106b, as normal when no signal is sent. When signal is sent, this is overlaid on the user's view of their environment, modifying that view by adding additional visual information to the user's view, thereby augmenting what would have been seen without the signal being sent.

The host device 102 may be a static computing device such as a computer, gaming console, etc., or may be a mobile computing device such as a smartphone or smartwatch. As previously described, the host device 102 generates or receives image data and transmits the data to the augmented reality glasses or virtual reality headset 104 for display.

The display device is connected to the host device 102 by a connection 108 which may be wired or wireless. While a wired connection minimises latency in transmission of data from the host to the display, wireless connections give the user much greater freedom of movement within range of the wireless connection and are therefore preferable. A balance must be struck between high compression of data, in particular video data, which can be used to enable larger amounts of data (e.g. higher resolution video) to be transmitted between the host and display, and the latency that will be introduced by processing of the data. Additionally, the use of high compression can cause artefacts (e.g. block edge artefacts) which can be very noticeable to a viewer, even if they occur in low visual acuity regions of the user's field of view.

Ideally, the end-to-end latency between sensing a user's head movement, generating the pixels in the next frame of the VR (virtual reality) scene and streaming the video should be kept below 20 ms, preferably below 10 ms, further preferably below 5 ms.

The wireless link should be implemented as a high bandwidth short-range wireless link, for example at least 1 Gbps, preferably at least 2 Gbps, preferably at least 3 Gbps. An "extremely high frequency (EHF)" radio connection, such as a 60 GHz radio connection is suitable for providing such high-bandwidth connections over short-range links. Such a radio connection can implement the WiFi standard IEEE 802.11ad. The 71-76, 81-86 and 92-95 GHz bands may also be used in some implementations.

The wireless links described above can provide transmission between the host and the display of more than 50 frames per second, preferably more than 60 fps, further preferably more than 90 fps. In some very recent examples, frame rates of 120 fps are being used.

In each of the VR and AR embodiments described above, the aim is to make the user feel immersed in the virtual/augmented environment. Part of this includes providing a lens system between the display panels 106a, 106b and a user's eyes to give a feel of a focal depth a few metres from the user (rather than the actual distance of a few centimetres). This extreme change in depth requires strong lenses to be used, and the use of strong lenses in turn increases the perceptibility of artefacts in the image, e.g. those caused by abrupt changes in display quality or boundaries between macroblocks at high compression.

The images for display on the or each screen, e.g. each of the two screens 106a, 106b can be provided according to the method set out below, in order to balance the competing demands of efficient use of computational resources and optimum user enjoyment.

Figure 2A:
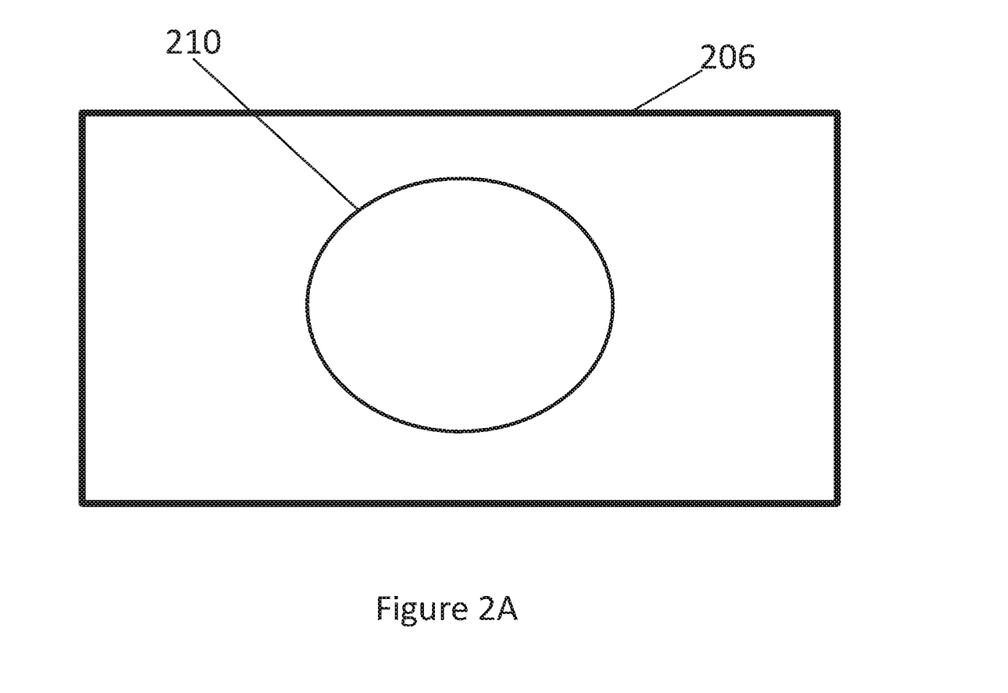
FIG. 2A shows a schematic of a screen with a boundary.

In FIG. 2A, a schematic of the screen 206 (e.g. one of screens 106a, 106b in FIG. 1) is shown. The screen has a nominal boundary 210 superimposed on it. This boundary 210 may be derived from a visual model, e.g. one which determines the foveal (high visual acuity) region to be a particular region, or it may be a simple geometric shape. As shown in the Figure, the nominal boundary 210 is elliptical, but depending on the model used, the shape may be different. In some cases, the nominal boundary 210 may be a circular one, e.g. enclosing a region which is less than or equal to a predetermined distance from a predetermined point on the screen.

The nominal boundary 210 encloses a region which is broadly centred on the centre of the screen 206. In some cases, the region enclosed by the boundary 210 may not be centred at the centre of the screen 206, depending on the visual model being used and other parameters such as expected or measured eye position of a user. Where there are two screens, one for each of a user's eyes, the visual model may result in the boundaries being mirror images of one another on the two screens. Similarly the exterior of the boundary 210 is towards the periphery of the screen 206. In most visual models, the inner region will be a region of higher visual acuity, and consequently will be a region in which visual information is displayed at higher display quality.

In FIG. 2A, the screen 206 has not been divided into tiles (or has been divided into tiles too small to see). In this case, the actual boundary between a first region and a second region (in which the display quality is different between the two regions) overlaps with the nominal boundary 210 (or at least weaves between pixels, while the nominal boundary 210 crosses pixels, with the scale being such that they are indistinguishable), so the two are not discernible in the Figure. Nevertheless, while tiles are not explicitly used, data for display in the second (peripheral) region may have been heavily compressed and may show compression artefacts, such as blockiness and artificial edges. The second region can be blurred (over the whole region or only near block edges, for example) in order to reduce this effect. Similarly, the regions close to the boundary can be blurred (not shown) in order to mask the transition between display qualities and reduce the occurrence of visual artefacts.

Figure 2B:
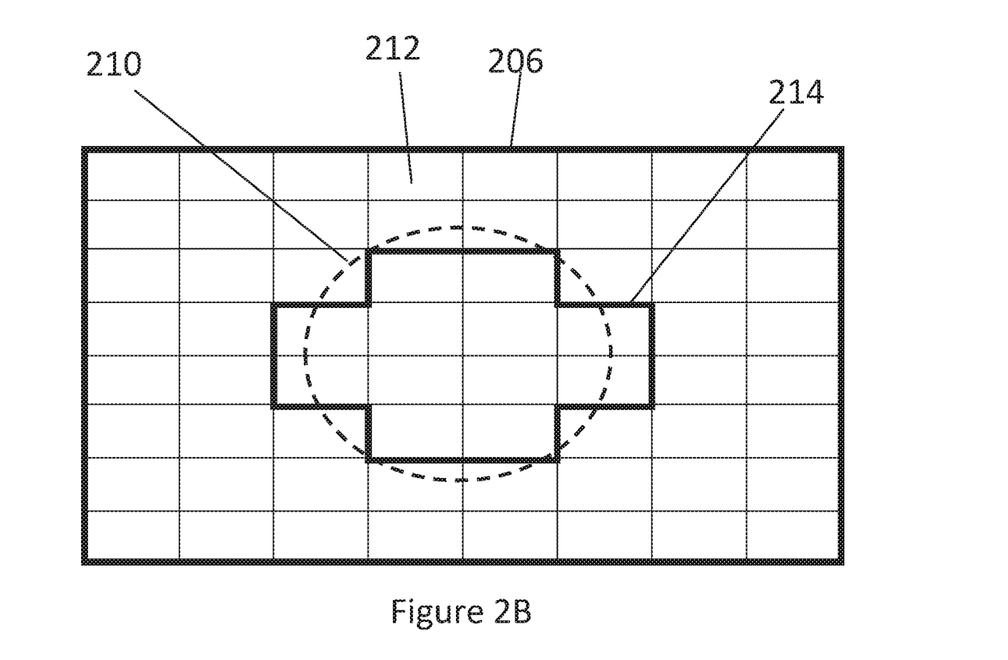
FIG. 2B shows a schematic of a screen with a dividing line corresponding to the boundary shown in FIG. 2A, where the screen is divided into tiles.

In FIG. 2B, a similar situation is shown, but in this case, the screen 206 is divided into a series of tiles 212. Since each tile is displayed at the same display quality, the boundary 214 cannot exactly overlap the nominal boundary 210 derived from the visual model. In general dotted lines show where the boundary should be if the model could be followed exactly (the nominal boundary), while solid lines show where the boundary actually is (due to distortions because of pixels or tiles, for example). In FIG. 2A, these two boundaries overlap so closely that no distinction can be made, but in FIG. 2B a clear distinction is seen. Of course, the situation shown in FIG. 2B is illustrative only, and the size of tiles relative to the overall screen size may be larger or smaller than illustrated here.

For ease of comparison, the nominal boundary 210 in FIG. 2B is the same as that in FIG. 2A, although it will be clear that different boundaries could be considered without loss of generality in the following. In FIG. 2B, the boundary 214 has been chosen to match the nominal boundary 210 as closely as possible, e.g. using a simple fitting procedure which converts the nominal boundary 210 to the actual boundary 214 by forcing the actual boundary 214 to run between tiles, and selecting the path which is the smallest deviation from the nominal boundary 210. "Smallest deviation" may mean the path which results in the boundary 214 enclosing a similar area to that enclosed by the nominal boundary 210, for example. Other definitions of closeness may also be used, e.g. selecting a path around tiles 214 which is a least squares deviation from the nominal boundary 210. In other cases, where the nominal boundary 210 crosses a tile, the boundary 214 is selected by running around the exterior edges of tiles which have more than 50% of their area inside the nominal boundary 210 and around the interior edges of tiles having less than 50% of their area inside the nominal boundary 210. In any case, the blurring can be applied, as above, to the boundaries between different display qualities and/or to reduce block edge artefacts.

Note that the method may include actually defining two delineations. A first one encloses the area which is to be displayed at high quality. A second boundary defines which regions are to be subjected to a blurring filter. In some cases this second boundary may be smaller than the first boundary, i.e. portions of the high quality region are nonetheless blurred, to reduce artefacts due to the change in display quality at the first boundary. The relative sizes of the two boundaries may be based on e.g. tile sizes, codec block sizes, etc. In some cases, it may be possible for the two boundaries to overlap.

Figure 3A:
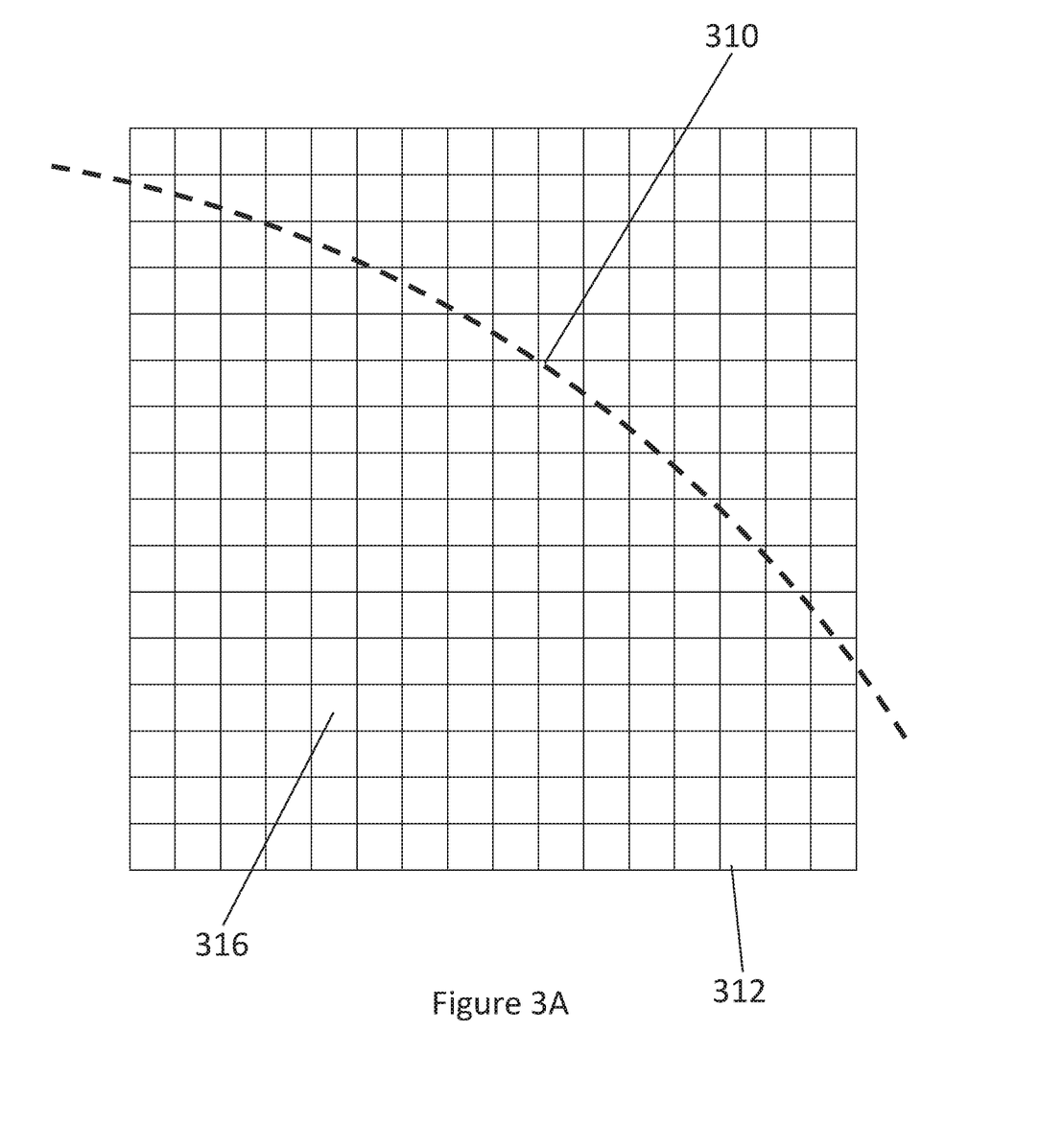
FIG. 3A shows a schematic of a tile intersected by a dividing line.

Considering this concept in more detail, FIG. 3A illustrates a tile 312 made up of individual pixels 316. In this example the tile 312 is made of a 16×16 array of pixels 316, but as set out above, tiles can have any number of pixels in either dimension. A nominal boundary 310 crosses the tile in an arc from top left to mid right. By analogy with FIGS. 2A and 2B, where the nominal boundary 210 encloses an elliptical region, the nominal boundary 310 in FIG. 3A can be thought of as being part of a loop which encloses the lower left portion of the tile 312, while the upper right portion of the tile 312 is excluded.

It can be seen from the position of the nominal boundary 310 relative to the tile 312 that more of the tile 312 is enclosed by the nominal boundary 310 that is excluded by the boundary 310. Moreover, when the boundary is forced to lie along the edges of the tile 312, it is clear that the smallest deviation is to run the boundary along the top and right edges. In either of these examples of "closeness", the tile would be included within the boundary.

In other cases, however, different methods may be used to determine where the boundary runs in relation to the tile 312. In some examples, the calculation is a probabilistic one, in which the probability that the tile is "inside" the boundary is proportional to the area of the tile which is inside the nominal boundary 310.

To explain this idea a little further, consider drawings 3B to 3E. Each of these Figures shows a screen 306 divided into a series of tiles 312 (in this case 80 tiles in a 10×8 arrangement) with a nominal boundary 310. A boundary 314 between the area to be shown at a first display quality and the area to be displayed at a second display quality is shown in each Figure.

In cases where the display quality of a tile 312 is probabilistically determined based on the location of a nominal boundary 310, there are different shapes which the boundary may take. For example in FIG. 3A, the smallest boundary 314 possible in this example is shown, in which only four tiles inside the nominal boundary 310 are enclosed by the boundary 314. In order to obtain this smallest boundary, any tile 312 through which the nominal boundary 310 runs has been excluded. In other words, the boundary 314 runs along the inner edges of such tiles. The smallest possible boundary 314 shown here is clearly a relatively small area in the centre of the screen. While unlikely that the boundary will be this small, for the reasons set out below, the possibility that only this small area be displayed at, e.g. the higher display quality may be taken into account when determining the visual model to be used, which in turn determines the location of the nominal boundary 310. Put another way, the nominal boundary 310 may be selected based on a particular visual model, but also taking into account what the minimum enclosed area would be under such a model, and enlarging the nominal boundary 310 if appropriate.

Of course, where the display quality of a given tile is probabilistically determined, this arrangement is only one of many possibilities. It can be seen that the nominal boundary runs through 16 different tiles, resulting in $2^{16}$=65536 different combinations of tiles, each of which will have a different probability of being shown, based on the probabilities that each of the individual tiles are themselves displayed at the first or second display qualities.

For example, as set out above, the ratio of area of the tile inside or outside the nominal boundary 310 can be linked to the probability of the tile being shown at the first display quality (that is being inside the boundary 314). While this could in principle be determined for every tile making up the screen 306, it is clear that (in cases where probability is directly related to the ratio of the area inside/outside the nominal boundary 310) tiles which are not intersected by the nominal boundary 310 will have a probability of either 1 or 0, depending on whether they are completely enclosed or completely excluded from the boundary. This fact can be used to reduce the probability calculations to only consider those tiles intersected by the boundary.

Taking FIG. 3A as a specific example of this, it is clear that some of the tiles, e.g. tile 312a are almost entirely within the nominal boundary 310. This corresponds to the tile having a relatively high probability of being inside the boundary 314 (and consequently the boundary 314 shown in FIG. 3A which excludes tile 312a is an unlikely arrangement). Similarly tile 312b is largely outside the nominal boundary 310, corresponding to a relatively low probability that this tile 312b will be inside the boundary 314. For completeness, attention is drawn to tile 312c, which is approximately 60-70% inside the nominal boundary 310, corresponding to a middling probability of being inside or outside the boundary 314.

Figure 3B:
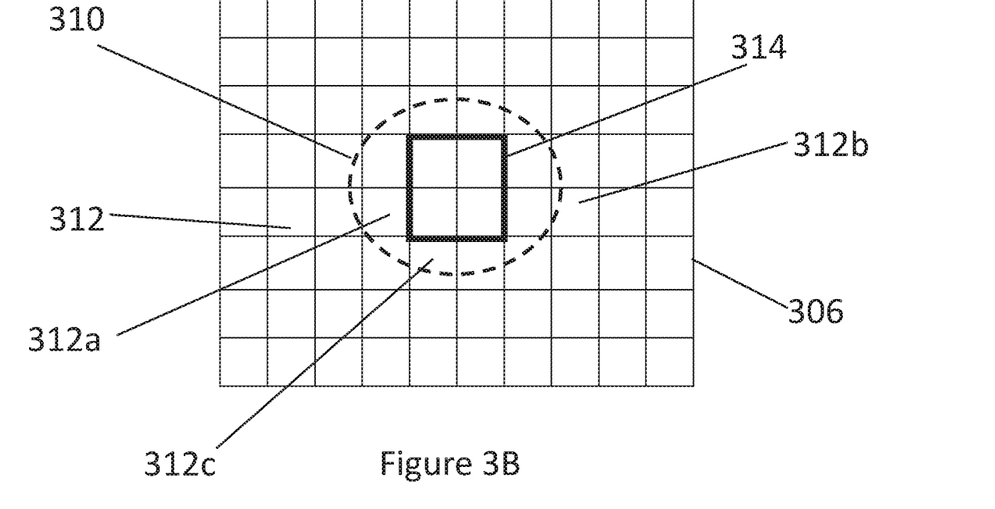
FIG. 3B shows a screen divided into tiles with a dividing line and the smallest possible boundary around some of the tiles.
Figure 3C:
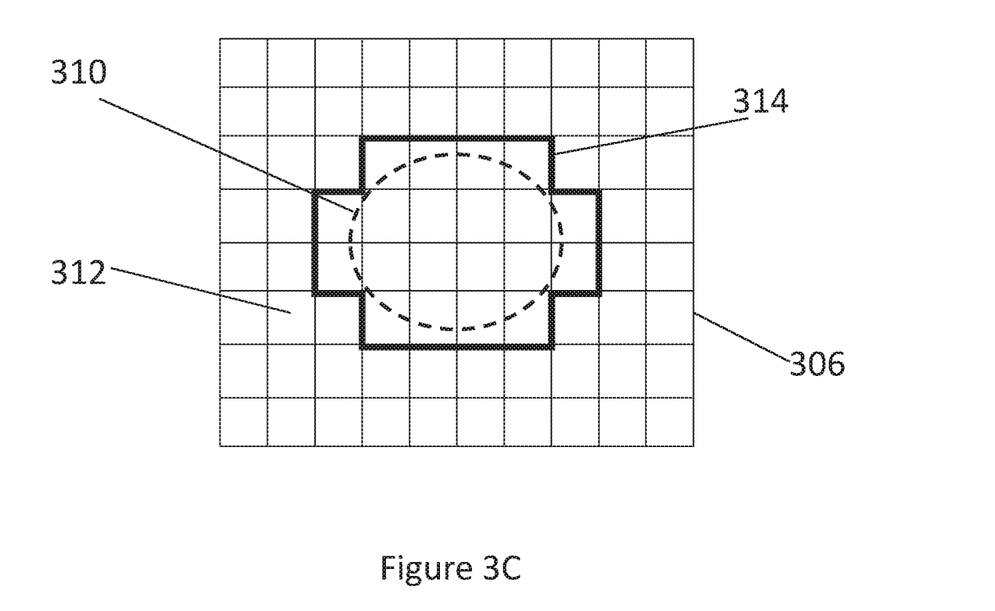
FIG. 3C shows a screen divided into tiles with the same dividing line as in FIG. 3B and the largest possible boundary around some of the tiles.

Turning now to FIG. 3B, the largest boundary 314 possible in this example is shown, in which twenty tiles are enclosed within the boundary 314, which itself also encloses the nominal boundary 310. In order to obtain this largest boundary, any tile 312 through which the nominal boundary 310 runs has been included. In other words, the boundary 314 runs along the outer edges of such tiles. The largest possible boundary 314 shown here is clearly a relatively large area in the centre of the screen. While unlikely that the boundary will be this large, the possibility that all of this area be displayed at, e.g. the higher display quality may be taken into account when determining the visual model to be used, which in turn determines the location of the nominal boundary 310. Put another way, the nominal boundary 310 may be selected based on a particular visual model, but also taking into account what the maximum enclosed area would be under such a model, and reducing the nominal boundary 310 if appropriate, for example to match the available image processing and delivery resources.

Figure 3D:
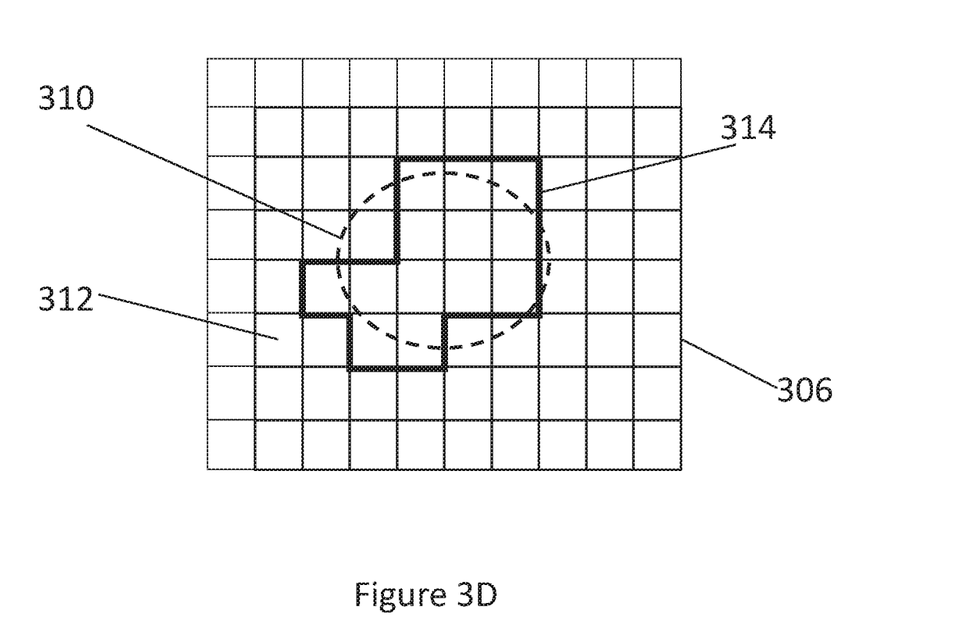
FIG. 3D shows a screen divided into tiles with the same dividing line as in FIGS. 3B and 3C and a boundary around some of the tiles.
Figure 3E:
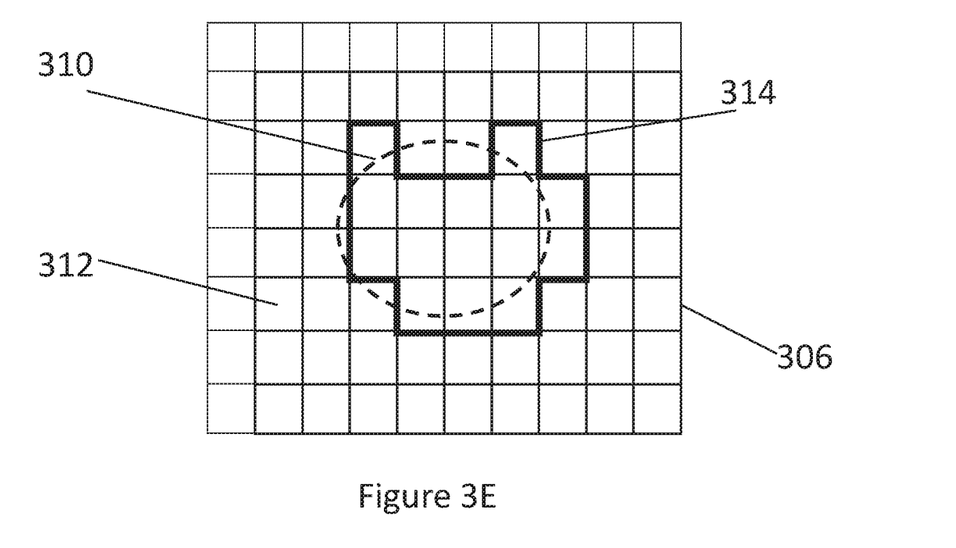
FIG. 3E shows a screen divided into tiles with the same dividing line as in FIGS. 3B to 3D and a boundary around some of the tiles.

Turning now to FIGS. 3D and 3E, other possible boundaries 314 are shown which can occur with a probability determined from the probabilities of the individual tiles 312.

In each case the blurring step occurs in regions outside to the boundary, as set out above, for example in order to reduce blockiness between adjacent low-quality tiles. The region near to the boundary between the first and second regions can also be blurred, to mask the abrupt change in quality. In some cases, the blurring even extends inside the boundary to blur parts of the first region inside the boundary to improve the masking of the boundary between high and low quality regions. This blurring may be a Gaussian blur, a dithering effect or other blurring means such as in-built deblocking filters. An interesting effect can occur when the location of the boundary is probabilistically determined on a regular basis. Specifically, it may be possible to form a satisfactory blurring effect with little or no additional blurring steps simply by virtue of the actual boundary 314 shifting regularly around the nominal boundary. Due to the nature of the determination of the boundary 314, this inherently results in blurring in regions around the nominal boundary 310. Since the different possible boundary locations are cycled through based on the probabilistic model for determining the location of the boundary, there is no sharp boundary over time. If the refresh rate (i.e. rate at which the boundary is recalculated) is faster than the human-detectable framerate, the image will be blurred in the human visual system, and no hard edges will be detected. The boundary could be calculated e.g. every new frame or, where the different quality regions comprise different framerates, the refresh rate can be selected as the least common multiple of the different framerates, to force the changes in boundary to be synchronised with each frame's display time. To reduce the refresh time, each possible frame rate can be related to the others by a constant factor, e.g. 2.

In some examples of the invention, there may be more than two regions of the screen, wherein each region of the screen corresponds to a different display quality. The above discussion applies equally well to this situation, where each boundary (e.g. boundary between $1^{st}$ and $2^{nd}$ region, between $2^{nd}$ and $3^{rd}$, $3^{rd}$ and $4^{th}$ etc.) is treated as set out above. This may be beneficial because many visual models do not sharply divide human vision into two regions with a sharp divide between high visual acuity and low visual acuity, but represent more of a fade from high to low across the field of view. By allowing multiple fields, this gradual fade can be approximated across the screen.

In such cases, the regions to be blurred can be chosen to be any regions in which the display quality is below a threshold, the threshold being determined based on user preferences, calibrations, and/or visual models. The general idea would be that below a certain display quality, block edge artefacts become noticeable to a user, even in low visual acuity regions of their field of view. Regions at this display quality and lower would be eligible for blurring. In addition, the blurring of boundaries between regions of different display quality could be enacted only where one of the regions which meet at the boundary is at or below the threshold display quality. In some examples, the strength and/or extent of blurring can be linked to the display quality, where lower display quality leads to greater likelihood of blurring, a larger blurred region near to boundaries and/or a stronger blurring filter being applied.

A particularly interesting aspect of having more than two regions of differing display quality is that the processing power required to display the visual information across the entire screen may not change as much as it may seem on the surface. When there are two areas, a high quality (and thus high processing power) one and a lower quality (and thus low processing power) one, an increase in size of the high quality region at the expense of some of the area of the lower quality region necessarily requires more processing power to display. Conversely, where three or more regions exist, an increase in the area of the highest quality region at the expense of an intermediate quality region can be offset at least in part by an increase in the area attributed to the lowest quality region, also at the expense of the intermediate quality region.

Specifically, for simplicity take a constant radius model. With two regions, the inner circular region can expand at the cost of some of the periphery. Where the inner region is the high quality region, an increase in processing cost is inevitable. With three regions, a circular central region, an annular middle region and an outer peripheral region, the circular region expands into the annular region, thereby increasing the computational cost of displaying the frame. However, this can be offset by also increasing the area peripheral region by shifting its inner boundary further inward (also into the annular region). Since the peripheral region necessarily has a larger boundary with the annular region than the inner circular region does, the gain in area for the peripheral region for a given change in radius of the circle describing the boundary between the annular and peripheral region is larger than the gain in area for the same radius change of the boundary between the circular central region and the annular region. By adjusting the three display qualities being used and the radius changes, the processing power required can be kept relatively constant, for example. In this example, the blurring can occur at boundaries between display qualities and/or in regions where the display quality is lower than a particular threshold, for example. In this latter case, it may be that the blurring occurs only at the edges of blocks, or it may be that the blurring occurs throughout the low quality region. The amount and/or probability of blurring in a given region may be probabilistically determined, e.g. inversely proportional to display quality (so that lower quality regions are more likely to be blurred, or more likely to be blurred to a large degree.

Figure 4:
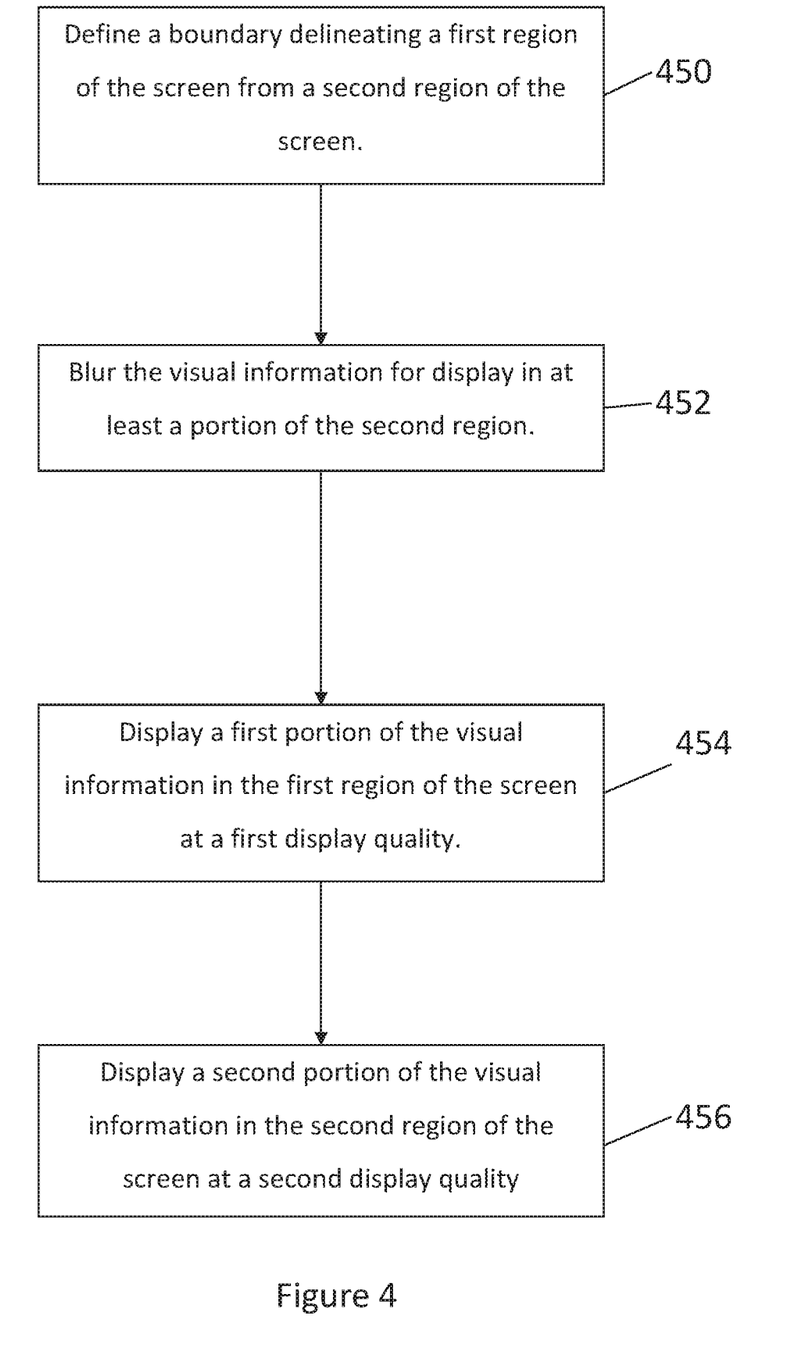
FIG. 4 shows a flow chart illustrative of a method described herein.

Finally, turn to FIG. 4. Here a flow chart is shown describing a method according to the present disclosure. The method begins with a first step 450 in which a boundary is defined which delineates a first region of the screen from a second region of the screen. The boundary may be determined, for example, by any of the means set out above, and may be based on models of the perceptiveness of the human visual system at different points in the field of view.

The next step 452 of the method involves blurring the visual information for display in at least a portion of the second region. This may be performed prior to display, as implied by the order of the steps, by passing the data through a filtering or masking step to add e.g. Gaussian blur, dithering, deblocking filter etc. in the desired parts of the visual information, i.e. those parts adjacent to the boundary. This could be performed after decoding the visual data, but prior to display, for example. in other cases, where the blurring filter forms part of the codec, the decoding step may be configured to introduce blurring, although in pure block based codecs, this would not be possible, since each block is processed completely independently of the others, so blurring would not be possible at this level (until the data is decoded and assembled into frames, for example).

In other cases, the steps may be carried out in a different order than that presented in FIG. 4. For example, the act of displaying the visual information may itself be a blurring step, as set out above, by virtue of particular regions of the screen being displayed at different display qualities in rapid succession (e.g. potentially different in every video frame). Consequently, the blurring step is in this case a consequence of a probabilistic determination (or any other time-varying determination, e.g. following a set pattern) of the location of the boundary, rather than a blurring step applied to the data prior to display.

Finally in steps 454 and 456, a first portion of the visual information is displayed at a first display quality in the first portion of the screen and a second portion of the visual information is displayed at a second display quality in the second portion of the screen. The portions may each or either have blurring steps already applied to them, depending on the application.

The invention claimed is:

1. A method of presenting visual information on a screen comprising a plurality of tiles, comprising:

defining a boundary delineating a first region of the screen from a second region of the screen;

displaying a first portion of the visual information in the first region of the screen at a first display quality;

displaying a second portion of the visual information in the second region of the screen at a second display quality;

determining a subset of tiles from the plurality of tiles of the screen, wherein each tile in the subset is intersected by the defined boundary;

displaying, within each tile in the subset, corresponding visual information at the first display quality or the second display quality according to a respective probability associated with the respective tile;

wherein the second display quality is lower than the first display quality; and blurring the visual information in at least a portion of the second region.

2. The method of claim 1, further comprising blurring parts of the first and/or second regions of the screen which are adjacent to the boundary.

3. The method of claim 1, wherein the first region of the screen is towards a centre of the screen and the second region is towards a periphery of the screen.

4. The method of claim 1, wherein the first region of the screen is towards a centre of an expected field of view of a user and the second region is towards a periphery of the expected field of view of a user.

5. The method of claim 1, wherein a location of the boundary is based on one or more of:

a radial distance from a centre of the screen;

a foveal vision region in an expected field of view of a user; or in part on an expected position of a user's eye(s) relative to the screen.

6. The method of claim 1, wherein a location of the boundary changes over time, and wherein the location of the boundary is based in part on one or more of:
a type of visual information being displayed;
a predicted position and/or movement of a user's eye(s);
a detected position and/or movement of a user's eye(s);
one or more focal parameters of a lens system;
an available bandwidth for transmitting the information to the screen;
an available processing power for decoding the visual information for display;
and/or
user settings.

7. The method of claim 6, wherein the blurring is caused in part by changes in the location of the boundary over time.

8. The method of claim 1, wherein a location of the boundary is static.

9. The method of claim 1, wherein the blurring step is applied to visual information adjacent to portions of the second region where neighbouring tiles meet.

10. The method of claim 9, wherein a location of the boundary is determined in a probabilistic manner; and wherein
a probability that a tile is in the first region of the screen is related to a location of that tile with respect to a centre of the screen or a centre of a foveal vision region in an expected field of view of a user.

11. The method of claim 1, wherein:
where a given tile is located such that entire tile is entirely inside a foveal vision region in an expected field of view of a user or located less than a radial distance from a centre of the screen, the respective probability is 1;
where a given tile is located such that the tile is entirely outside the foveal vision region in the expected field of view of the user or located more than the radial distance from the centre of the screen, the respective probability is 0; or
where a given tile is located such that only a part of the tile is inside the foveal vision region in the expected field of view of the user or located less than the radial distance from the centre of the screen, the respective probability is between 0 and 1,
wherein the respective probability is proportional to a proportion of the tile that is inside a foveal vision region in the expected field of view of the user or located less than the radial distance from the centre of the screen.

12. The method of claim 1, wherein the visual information comprises video data.

13. The method of claim 1 wherein the screen is mounted in a headset configured to be worn on a viewer's head.

14. The method of claim 13, wherein there are two screens in the headset, each one operating according to the method of claim 1, and wherein the method of claim 1 is carried out independently in respect of visual information to be presented on each of the two screens.

15. A system for presenting visual information on a screen comprising a plurality of tiles, comprising:
a processor;
a source of visual information; and
a screen;
wherein the processor is configured to process the visual information by:
defining a boundary delineating a first region of the screen from a second region of the screen; and
receiving visual information from the source and send visual information to the screen in a format which causes the screen to:
display a first portion of the visual information in the first region of the screen at a first display quality;
display a second portion of the visual information in the second region of the screen at a second display quality;
determine a subset of tiles from the plurality of tiles of the screen, wherein each tile in the subset is intersected by the defined boundary; and
display, within each tile in the subset, corresponding visual information at the first display quality or the second display quality according to a respective probability associated with the respective tile;
wherein the second display quality is lower than the first display quality; and
blurring the visual information in at least a portion of the second region.

16. The system of claim 15, wherein the processor is further configured to blur parts of the first and/or second regions of the screen which are adjacent to the boundary prior to sending the visual information to the screen.

17. The system of claim 15 wherein the screen is mounted in a headset configured to be worn on a viewer's head.

18. The system of claim 17, wherein there are two screens in the headset.

19. The system of claim 18, wherein the processor is further configured to process the visual information independently in respect of visual information to be presented on each of the two screens.

20. The system of claim 15, wherein the respective probability is proportional to a proportion of the tile that is inside a foveal vision region in an expected field of view of a user or located less than a radial distance from a centre of the screen.

* * * * *